United States Patent [19]
Smith et al.

[11] 4,131,187
[45] Dec. 26, 1978

[54] FRICTION CLUTCH APPARATUS

[75] Inventors: Grant H. Smith; Ronald L. Carlson, both of Rockford, Ill.

[73] Assignee: Borg-Warner Corporation, Chicago, Ill.

[21] Appl. No.: 801,176

[22] Filed: May 27, 1977

[51] Int. Cl.² ............. F16D 19/00; F16D 13/46
[52] U.S. Cl. ................... 192/99 A; 192/70.3
[58] Field of Search .......... 192/99 A, 70.29, 70.3, 192/111 A

[56] References Cited

U.S. PATENT DOCUMENTS

| 1,993,124 | 3/1935 | Tower | 192/70.3 X |
|---|---|---|---|
| 2,219,139 | 10/1940 | Nutt et al. | 192/70.29 |
| 2,895,581 | 7/1959 | Lysett | 192/99 A |
| 2,920,731 | 1/1960 | Zeidler | 192/99 A X |
| 3,308,913 | 3/1967 | Montgomery | 192/99 A X |
| 3,417,844 | 12/1968 | Zeidler | 192/99 A X |

Primary Examiner—Benjamin W. Wyche
Attorney, Agent, or Firm—Herman E. Smith

[57] ABSTRACT

A rotatable friction clutch apparatus having improved retraction means including retraction levers and mounting means therefor arranged and constructed to permit individual adjustment of the lever ends in the axial direction such that several levers can be adjusted to a common plane perpendicular to the axis of rotation and to avoid centrifugal displacement of the retracting levers during rotation of the clutch; each retracting lever is provided with a resilient retainer clip urging the lever into rocking engagement with a wire-like fulcrum and retaining the lever against radial inward displacement.

5 Claims, 6 Drawing Figures

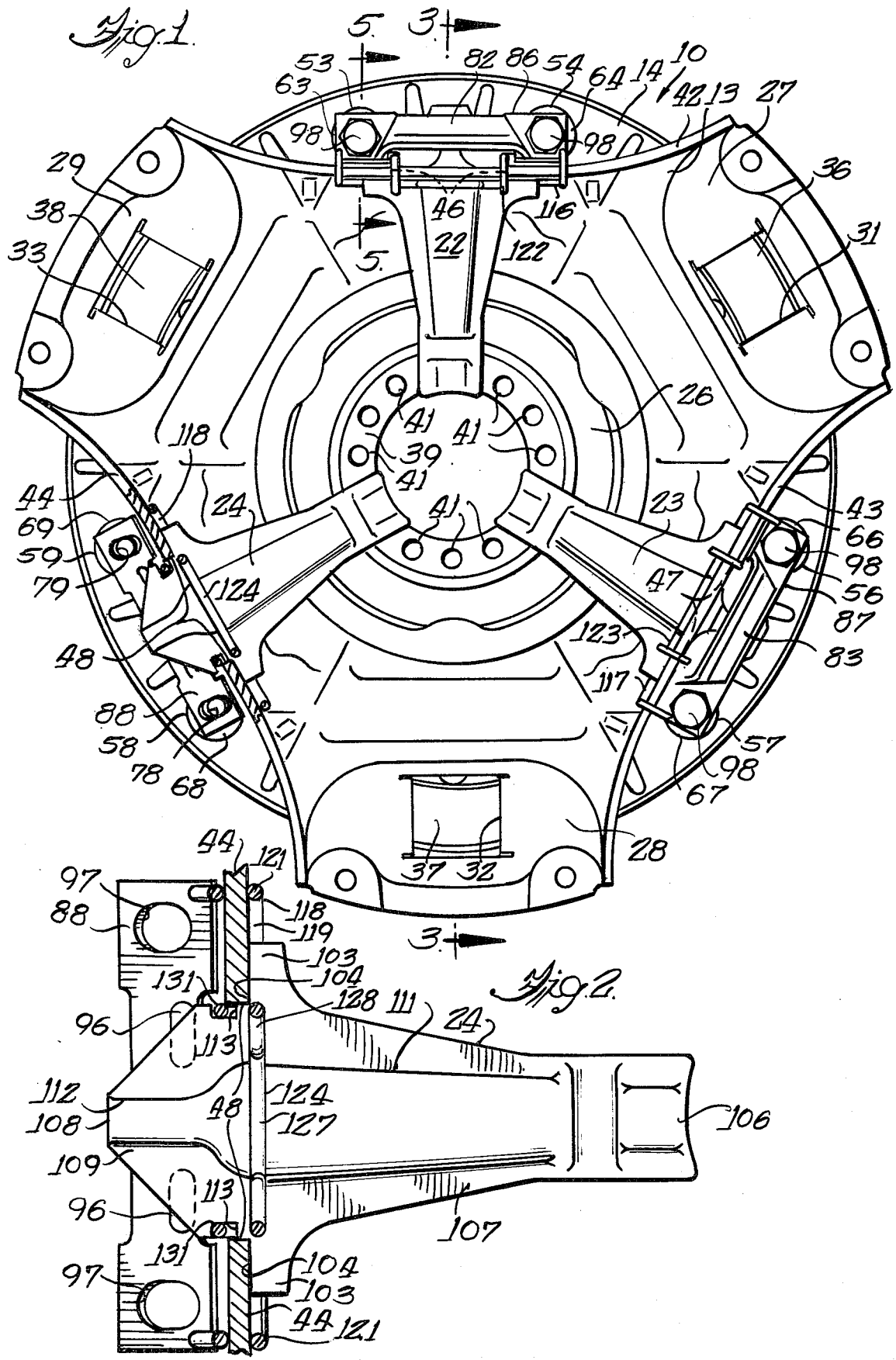

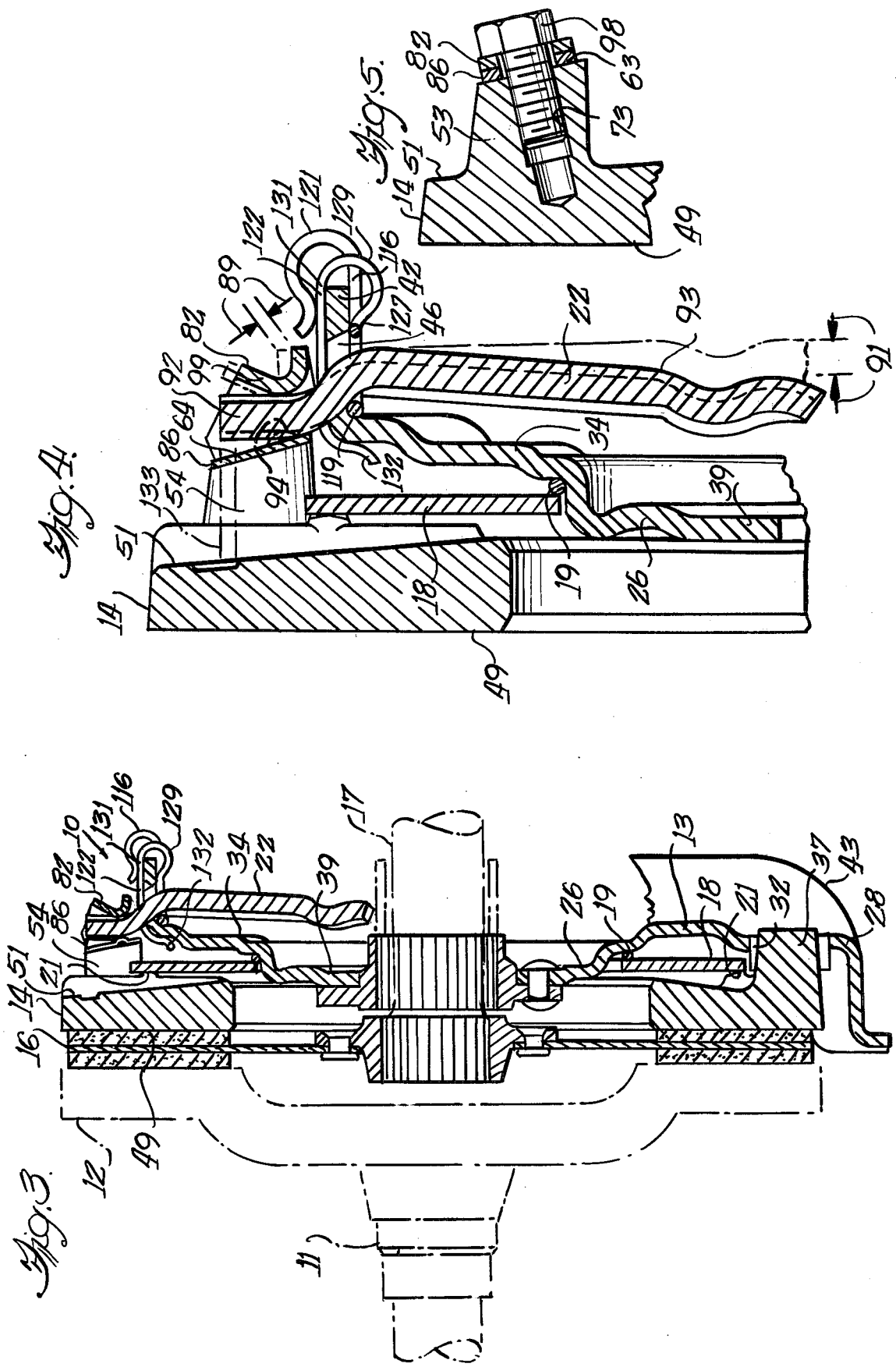

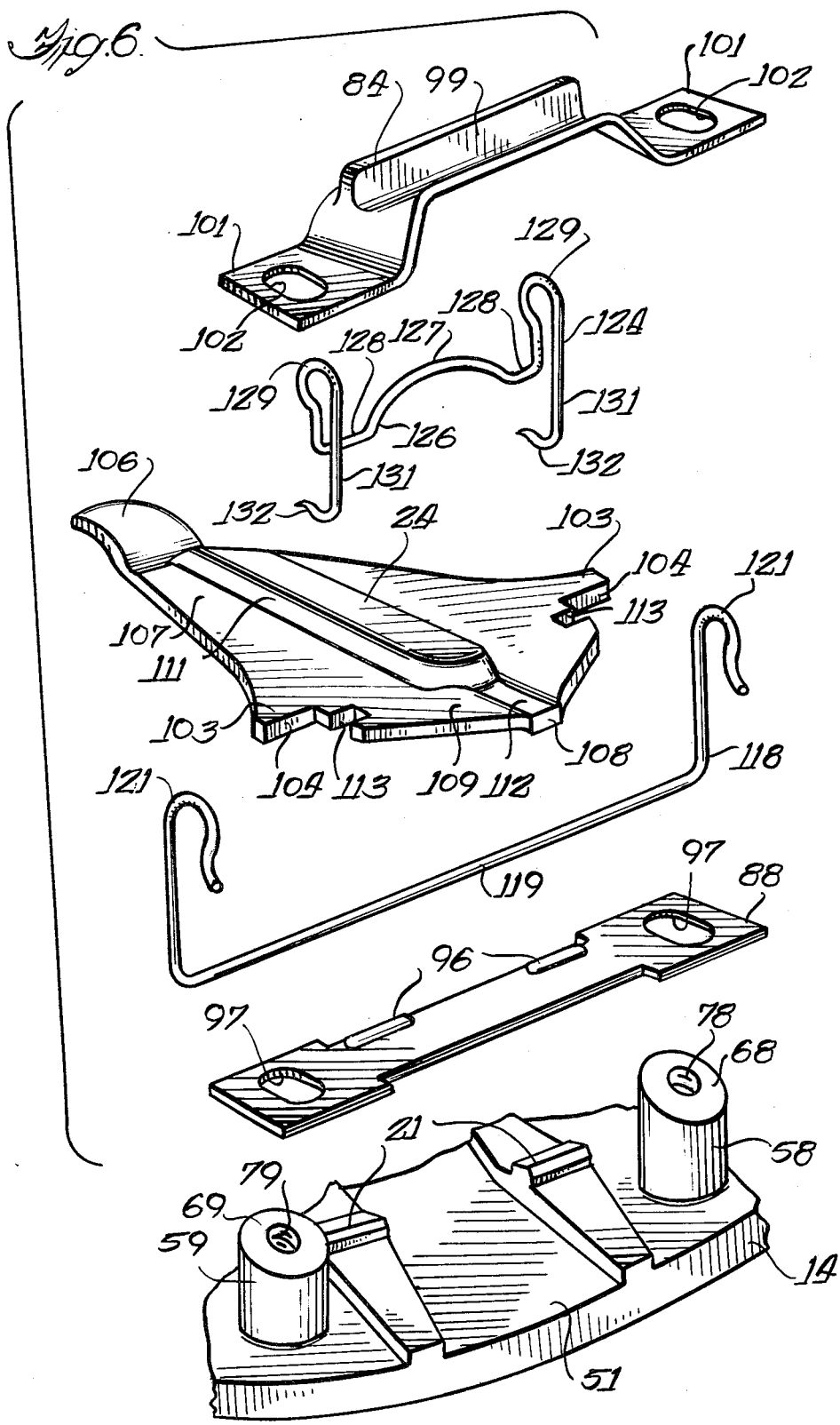

FRICTION CLUTCH APPARATUS

BACKGROUND OF THE INVENTION

1. Field

The present invention relates to rotatable friction clutches and more particularly to improved retracting means therefor.

Rotatable friction clutches may include an axially movable pressure plate which is normally urged in an engaging direction by means of a spring arrangement and which is movable in an opposite or releasing direction by an arrangement of retracting levers in cooperation with an operating linkage. It is desirable that the ends of the retracting levers occupy a common plane normal to the axis of rotation such that the several levers share the load imposed by the operating linkage, and it is further desirable that the plane occupied by the ends of the levers be axially adjustable so that the pressure plate will be free from dragging engagement with the friction plate when the clutch is released.

The manufacturing tolerances of the various components of a clutch may result in differing axial locations for the lever ends upon initial assembly. Where the ends of the levers are not in a plane perpendicular to the axis of the chuck, release of the clutch results in uneven movement of the pressure plate causing the pressure plate to drag on the friction plate. In addition, rotation of the clutch may impose centrifugal forces on the levers which tend to pivot the lever ends from a desired axial location.

2. Prior Art

In the prior art, it is known to provide springs in the mounting structure for the levers which deflect to account for minor variations in lever position due to manufacturing tolerances. It is known also to provide levers which are inherently resilient such that differences in lever position are taken up by deflection of the lever itself. Where rigid levers are employed, it has been known to provide radially adjustable stops in the lever mounting structure which can be adjusted to bring the several lever ends into a common plane. A further solution in the prior art is the use of axial shims in the lever mounting structure by which the levers are pivoted to bring the several lever ends into a common axial plane. It is also known to provide auxiliary spring members associated with retracting levers which serve to prevent the levers from radial displacement toward the axis of the clutch.

SUMMARY OF THE INVENTION

The present invention relates to improvements in retracting means for a friction clutch including lever construction and mounting means therefor which resists centrifugal displacement of the levers and provides for individual adjustment of the several levers. One advantage of the invention is to be found in the provision of a reaction bracket which is adjustably slideable along a beveled surface inclined with respect to the axis of rotation of the clutch, the bracket engaging a lever for pivoting the lever about its fulcrum whereby the end of the lever can be moved to a selected axial position. Another advantage of the invention is to be found in the provision of an interlocking engagement of a lever with the cover member which limits centrifugal displacement of the levers during rotation of the clutch. A still further advantage of the invention is to be found in the provision of wire-like retainers embracing portions of the levers and cover member arranged for retaining the levers in assembly with the cover member while avoiding the use of close fitting pins, bushings and the like.

BRIEF DESCRIPTION OF THE DRAWINGS

FIG. 1 is an end view of a clutch according to the present invention;

FIG. 2 is an enlarged view of a lever with fragmentary portions of the mounting means therefor;

FIG. 3 is a section view of the clutch taken along the line 3—3 of FIG. 1;

FIG. 4 is an enlarged fragmentary view of a portion of FIG. 3 illustrating adjustability of a lever by means of a slideable reaction bracket;

FIG. 5 is a fragmentary section view of a portion of the pressure plate showing an inclined surface and a reaction bracket thereon; and FIG. 6 is an exploded view of a lever, retainer means and reaction bracket.

DESCRIPTION OF THE PREFERRED EMBODIMENT

Referring now in more detail to the drawings, the reference character 10 indicates a rotatable friction clutch including an arrangement of levers and mounting means therefor according to the present invention. A drive shaft 11 is drivingly connected to a flywheel 12 which in turn is drivingly connected to a clutch cover member 13 such that the drive shaft, flywheel and cover member rotate together. A pressure plate 14 is drivingly connected to the cover member 13 but is axially movable with respect thereto for engaging and releasing a friction plate 16 which is drivingly connected to driven shaft 17. An annular Belleville washer spring 18 bears against a ring 19 in cover member 13 and engages a ridge portion 21 of pressure plate 14 for urging the pressure plate into engagement with friction plate 16. Three retracting levers 22, 23 and 24 are mounted in cover member 13 and arranged for moving pressure plate 14 axially against the bias of spring 18 for releasing the pressure plate 14 from engagement with friction plate 16.

Cover member 13 is of a stamped sheet metal construction including a central portion 26 having three leg portions 27, 28 and 29 extending radially therefrom. Each leg portion is punched and formed to provide drive sockets 31, 32 and 33 which receive respective drive lugs 36, 37, 38 of the pressure plate 14. The drive lugs and drive sockets provide a rotary drive connection between cover member 13 and pressure plate 14 while permitting axial movement of the the pressure plate with respect to the cover member. A dished portion 34 surrounds central portion 26 of cover 13 and serves to pilot the ring 19 and annular spring 18. In addition, dished portion 34 engages the foot portions 132 of the retainer clips 122, 123, 124. If desired, an inner portion 39 of central portion 26 can be provided with a series of rivet holes 41 for connection to a sleeve for a power take off torque tube. The cover member 13 includes three upstanding wall portions 42, 43 and 44 each extending between an adjacent pair of leg portions. Each wall portion includes a chordally extending central portion merging into curved end portions. Each wall portion includes respective apertures 46, 47, 48 for receiving a respective retracting lever 22, 23 or 24.

Pressure plate 14 is generally annular in shape and, in cross section, tapers toward the outer rim. The front face 49 of pressure plate 14 is a smooth machine finished surface for engagement with the friction material on friction plate 16. The rear face 51 includes the three drive lugs 36, 37 and 38 projecting axially therefrom and the ridge portion 21. In addition to the drive lugs and ridge portions, rear face 51 includes three pairs of bosses 53, 54, 56, 57 and 58, 59. Each boss has a beveled surface 63, 64, 66, 67, 68, 69 which is inclined with respect to the axis of rotation of the clutch. Each boss includes a threaded aperture such as 73, 78 and 79 which extends perpendicularly with respect to a respective inclined or beveled surface.

Each pair of bosses 53, 54, 56, 57 and 58, 59 serve as mounting means for a reaction bracket and keeper plate such as reaction brackets 82, 83, 84 and keeper plates 86, 87, 88. Each reaction bracket and associated keeper plate engages a respective lever, a typical arrangement being shown more clearly in FIGS. 4 and 5 with respect to lever 22, bracket 82 and keeper plate 86. Referring to FIGS. 4 and 5, reaction bracket 82 is slideable with respect to an inclined beveled surface such as 63, 64 and partakes of both radial and axial movement as indicated by the arrows 89, 89. Reaction bracket 82 engages outer lever arm portion of lever 22 and is effective to pivot the lever arm with respect to wall portion 42 such that adjusting movement of bracket 82 as indicated at 89, 89 results in axial movement of inner lever arm portion 93 as indicated by the arrows 91, 91. Thus adjusting movement of a reaction bracket with respect to its associated beveled surface is effective to determine the axial position of the inner lever arm of its associated lever. The several reaction brackets are adjusted to bring the inner lever arms of the several levers into a common axial plane.

Reaction brackets 82, 83 and 84 are of similar construction, reaction bracket 84 being typical and shown in perspective in FIG. 6. A typical reaction bracket includes an elongated V or wedge shaped portion 99 for engagement with an outer lever arm portion of a retraction lever. Mounting ears 101, 101 extend from opposite ends of the wedge portion and include elongated apertures 102, 102 for receiving bracket retaining screws 98.

As shown in FIG. 4, the keeper plate 86 is adjustable with respect to the beveled surfaces 63, 64 and includes raised portions 94, 94 engageable with outer lever arm portion 92. The keeper plate is adjustable along its associated beveled surface to that the raised portion 96 engages the outer lever arm portion on the side opposite to reaction bracket 82. The cooperation of the bracket and keeper plate with the outer lever arm serves to snugly retain the outer lever arm with respect to the pressure plate thereby avoiding a loose connection which could permit unintended pivotal movement of the retraction lever. Keeper plate 86, 87 and 88 are of similar construction, keeper plate 88 being shown in more detail in FIGS. 1, 2 and 6. The keeper plate 88 is in the shape of a substantially flat plate having raised portions 96, 96 protruding therefrom and including elongated slotted apertures 97, 97 near each end thereof which receive the bracket retaining screws 98.

The retraction levers 22, 23 and 24 are of similar construction, lever 24 being typical and shown in more detail in FIGS. 2 and 6. A typical lever is formed of sheet metal and includes a pair of ear portions 103, 103 extending laterally from opposite sides thereof. Each ear portion 103 includes an edge surface 104 which bears against a chordally extending portion of wall 44. The portion of the lever extending from ears 103 toward inner end 106 defines an inner lever arm 107 while the portion extending from ears 103 toward outer end 108 defines an outer lever arm 109. Outer lever arm portion 109 tapers from outer end 108 toward the ears 103, 103. The lever is formed with a ridge 111 and depression 112 for improving the rigidity of the lever. Outer lever arm portion 109 extends through aperture 48 in wall portion 44 for engagement with a reaction bracket and keeper plate. During rotation of the clutch, centrifugal forces act radially outwardly on the retraction levers urging the ear portions 103, 103 into abutting engagement with wall portion 44. The bracket and keeper plate engaging the outer lever arm resist pivotal movement of the lever due to centrifugal force. Each lever arm also includes a pair of spaced slots 113, 113 for receiving a retainer clip. The tapered outer lever arm portion serves as means for camming the leg portions 131, 131 of a retainer clip outwardly and laterally during insertion of a lever through a chordal wall portion, after which the leg portions snap into slots 113, 113 to retain the lever against radial displacement.

Three fulcrum members 116, 117 and 118 are provided, one for each of the retracting levers, fulcrum member 118 being typical and shown in perspective in FIG. 6. Each fulcrum member includes a substantially straight fulcrum portion 119 which extends transversely of a lever beneath the lateral ears 103, 103 thereof. Resilient hook portions 121, 121 extend from the fulcrum portion and grip a wall portion of the cover member. The wire-like fulcrum members are thus retained in position on the cover member for engaging the lever members and provide for rolling contact between the levers and respective fulcrum portions as the lever is pivoted with respect to the cover member.

Three retainer clips 122, 123 and 124 are provided for retaining the levers on the cover plate, clip 124 being typical and shown in perspective in FIG. 6. Each retainer clip includes a central bridge portion 126 having an arched mid-portion 127 which spans the ridge 111 of the retracting lever, and a pair of straight portions 128, 128 on opposite sides of the arched portion. The body portion 126, especially the straight portions 128, 128 thereof bear upon the lever urging the lever into rocking engagement with its associated fulcrum member. Bight portions 129, 129 extend from straight portions 128, 128 and clip over a wall portion of the cover such as 44. Leg portions 131, 131 extend downwardly from bight portions 129, 129 through the slots 113, 113 in the retracting lever. The leg portions 131, 131 thus serve to prevent radial displacement of the levers toward the axis of the clutch. Each leg portion terminates in a foot portion 132, 132 which snaps into place on a surface of the dished portion of the cover member immediately below a chordal wall portion thereof. The foot portions extend beneath and are spaced from the central bridge portion, providing a resilient clip for holding the lever against its fulcrum.

In the construction of clutches according to the present invention, it is desirable to provide a subassembly which can be handled as unit for installation in a vehicle. For example, the drive shaft 11 and flywheel 12 may be a part of the vehicle power plant while the friction plate 16 and driven shaft 17 may be part of the vehicle drive train, and the control linkage being a part of the vehicle. It is thus an important advantage to provide a subassembly including the pressure plate, cover member, load spring and retracting levers which is assembled and adjusted for correct cooperation with the power plant, drive train and operating linkage and which can be handled as a unit for installation in a vehicle. To this end, the pressure plate, cover member, load spring and retracting levers are often preassembled in fixtures to assure correct spring load and correct positioning of the inner lever arms of the levers. Retainer pins such as 133 are then installed between the pressure plate and the outer arms of the several levers which maintains the adjustment of the subassembly until it has been installed in the vehicle after which the retainer pins are removed.

What is claimed is:

1. In a rotatable friction clutch assembly having a cover member, a pressure plate mounted for axial movement with respect to said cover member, spring means engaging said cover member and said pressure plate urging said pressure plate in one direction, and retracting levers mounted on said cover member and engaging said pressure plate effective to move said pressure plate with respect to said cover member against the bias of said spring means, the improvement in means for mounting said levers comprising;

a plurality of axially extending chordal wall portions formed in said cover member, each of said chordal wall portions being associated with a respective retracting lever, each of said chordal wall portions extending substantially at right angles to a dished portion of said cover member and including an aperture for receiving an outer portion of a respective retracting lever, each of said levers including a pair of laterally spaced slots disposed in said outer portion; and a plurality of retainer clips mounted on said cover member arranged for retaining said levers in assembly with said cover member, each retainer clip having a pair of bight portions embracing a respective chordal wall portion, each of said bight portions including a leg portion engaging a respective slot in its associated retracting lever whereby the associated retracting lever is retained in a selected radial position with respect to said cover member.

2. In a rotatable friction clutch assembly according to claim 1, said retainer clip including a central bridge portion joining said pair of bight portions, each of said leg portions including a foot portion extending beneath said bridge portion and spaced therefrom, said foot portions resiliently engaging a dished portion of said cover member adjacent a respective chordal wall portion and said central bridge portion resiliently engaging a surface of a retracting lever adjacent said respective chordal wall portion urging said retracting lever toward said dished portion of said cover member.

3. In a rotatable friction clutch assembly according to claim 2, a plurality of wire-like fulcrum members secured to said cover member, each of said fulcrum members being disposed between said dished portion of said cover member and a respective retracting lever, said retainer clip resiliently urging said respective retracting lever into rocking contact with its associated fulcrum member.

4. In a rotatable friction clutch assembly having
a cover member,
a pressure plate mounted for axial movement with respect to said cover member,
spring means engaging said pressure plate urging said pressure plate in one axial direction;
at least one lever mounted for pivotal movement with respect to said cover member defining an inner lever arm portion extending toward the axis of said clutch assembly and an outer lever arm portion extending toward the perimeter of said clutch assembly,
said lever including laterally extending ear portions disposed at the junction of said inner and outer lever arm portions, said ear portions engaging a chordal wall portion of said cover member, said chordal wall portion defining an abutment limiting radial outward displacement of said lever with respect to said cover member,
a wire-like fulcrum member including a substantially straight portion disposed between said lever and said cover member adjacent said chordal wall portion, and further including a resilient hook portion engaging said chordal wall portion securing said straight portion in a selected position with respect to said chordal wall portion; and
a reaction bracket engaging said outer lever arm portion, said reaction bracket being secured to said pressure plate and being radially adjustable along a surface inclined with respect to the axis of said clutch assembly.

5. In a rotatable friction clutch assembly according to claim 4, said outer lever arm portion including a pair of spaced slots engaging a resilient retainer clip, said retainer clip being mounted on said chordal wall portion, and including portions bearing upon said lever urging said lever into rocking engagement with said fulcrum member, said clip including foot portions resiliently engaging a dished portion of said cover immediately below said chordal wall portion retaining said lever in contact with said fulcrum.

* * * * *